United States Patent [19]

Adams

[11] Patent Number: 5,211,332

[45] Date of Patent: May 18, 1993

[54] THERMOSTAT CONTROL

[75] Inventor: John T. Adams, Minneapolis, Minn.

[73] Assignee: Honeywell Inc., Minneapolis, Minn.

[21] Appl. No.: 769,038

[22] Filed: Sep. 30, 1991

[51] Int. Cl.$^5$ .............................. G05D 15/00
[52] U.S. Cl. ........................... 236/78 D; 364/557
[58] Field of Search .................... 236/78 D, 68 B; 364/557

[56] References Cited

U.S. PATENT DOCUMENTS 4,254,906 3/1981 Hayes .......................... 236/68 B X
4,489,882 12/1984 Rodgers ........................ 236/78 D
4,901,918 2/1990 Grald et al. .

Primary Examiner—William E. Wayner
Attorney, Agent, or Firm—Robert B. Leonard

[57] ABSTRACT

A process of operating an electronic thermostat so that it models the effects of a mechanical thermostat anticipator.

2 Claims, 4 Drawing Sheets

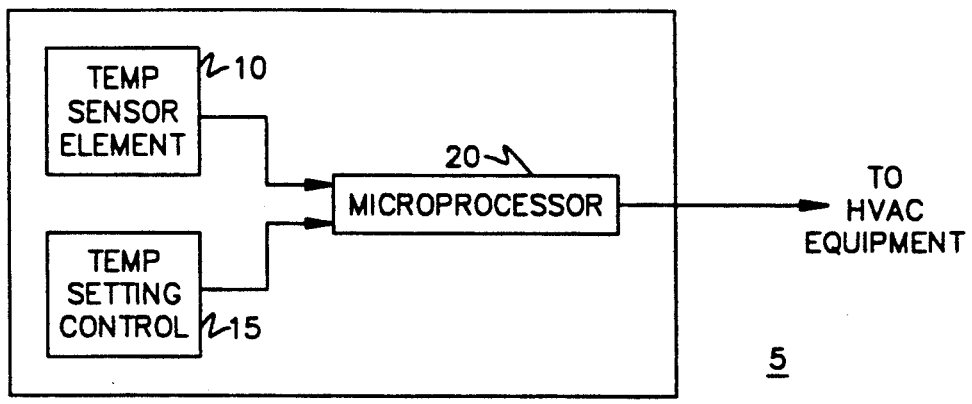
(PRIOR ART) Fig. 1
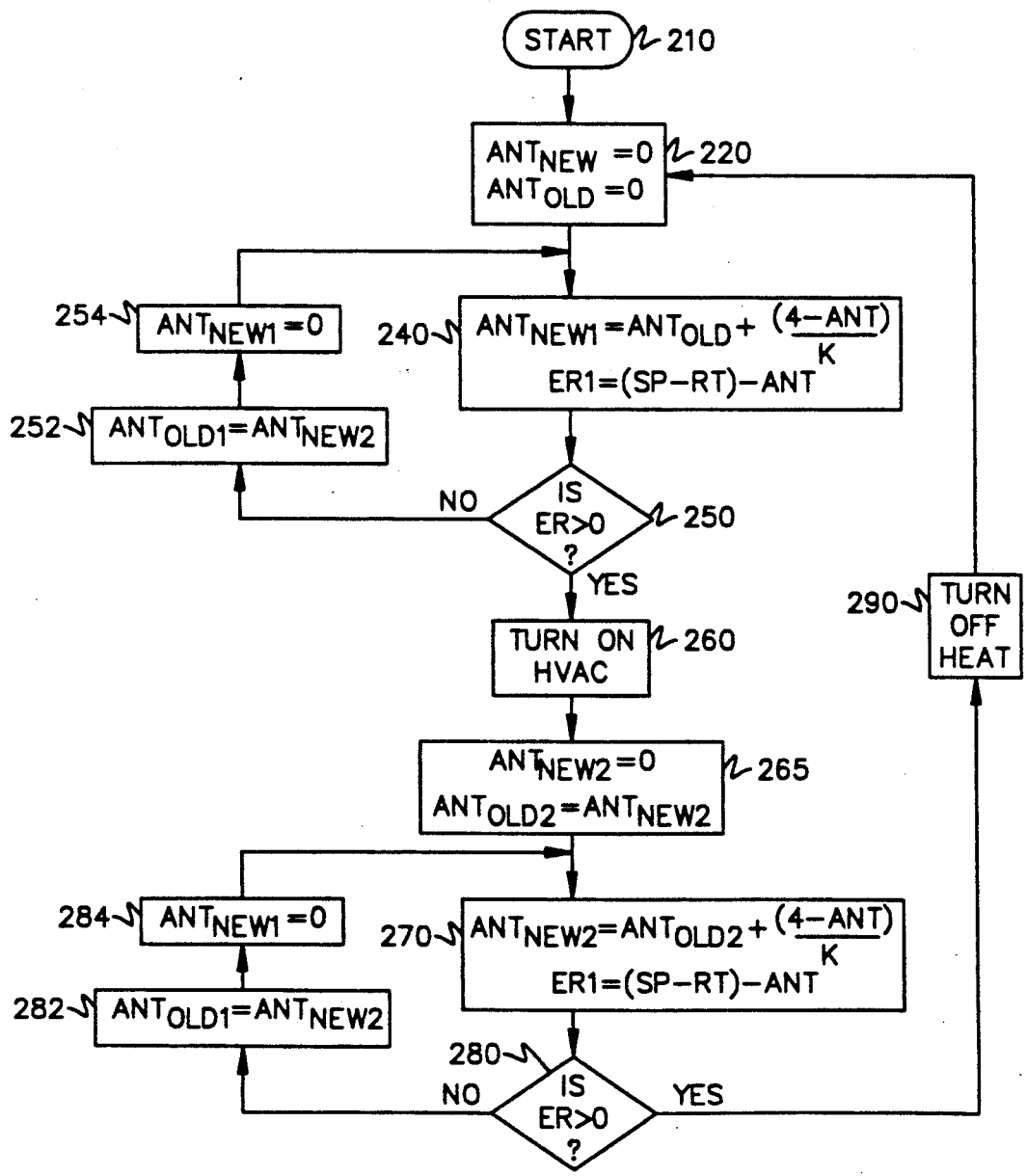
(PRIOR ART) Fig. 2

|  | MECHANICAL | | MODEL WITHOUT K | | MODEL WITH K | |
|---|---|---|---|---|---|---|
| DROOP | ON | OFF | ON | OFF | ON | OFF |
| 1/16 | 172 | 1663 | 153 | 7200 | 167 | 1458 |
| 2/16 | 175 | 1290 | 156 | 3600 | 170 | 1248 |
| 3/16 | 179 | 1084 | 160 | 2400 | 174 | 1091 |
| 4/16 | 182 | 945 | 163 | 1800 | 177 | 970 |
| 8/16 | 197 | 645 | 180 | 900 | 193 | 670 |
| 12/16 | 216 | 497 | 200 | 600 | 212 | 512 |
| 16/16 | 238 | 407 | 225 | 450 | 235 | 414 |
| 20/16 | 265 | 345 | 257 | 360 | 264 | 348 |
| 24/16 | 300 | 300 | 300 | 300 | 300 | 300 |
| 28/16 | 345 | 265 | 360 | 257 | 348 | 264 |
| 32/16 | 407 | 238 | 450 | 225 | 414 | 235 |
| 36/16 | 497 | 216 | 600 | 200 | 512 | 212 |
| 40/16 | 645 | 197 | 900 | 180 | 670 | 193 |
| 44/16 | 945 | 182 | 1800 | 163 | 970 | 177 |
| 45/16 | 1084 | 179 | 2400 | 160 | 1091 | 174 |
| 46/16 | 1290 | 175 | 3600 | 156 | 1248 | 170 |
| 47/16 | 1663 | 172 | 7200 | 153 | 1458 | 167 |

Fig. 5

THERMOSTAT CONTROL

BACKGROUND OF THE INVENTION

The present invention is related to thermostats and more specifically relates to thermostat initiation of a heating or cooling period.

Mechanical thermostats have for years included anticipators to minimize temperature swings in a room. These thermostats usually included a bimetal element for sensing temperature. The on and off times of the thermostat could be defined by:

$$t_{on} = \text{Time Constant} \times \ln \frac{(Droop - (TH - Diff))}{(Droop - TH)}$$

$$t_{off} = \text{Time Constant} \times \ln \frac{(Droop)}{(Droop + Diff)}.$$

where

Time Constant = time constant of the bimetal element;

Droop = setpoint minus room temperature;

TH = total heat which can be put into the bimetal by the anticipator; and

Diff = switch differential.

Electronic thermostats have attempted to model the effects of the anticipators. To this end, algorithms similar to that of FIG. 2, were adopted.

After starting at block 210, the Anticipator variables $ANT_{new1}$ and $ANT_{old1}$ are set equal to zero in block 220.

In block 240, two calculations occur. First, $ANT_{new1}$ was modified to equal the $ANT_{old1}$ plus the total heat which can be put into the mechanical anticipator being modeled (here, four degrees) minus the $ANT_{old1}$, the quantity divided by a constant K. K was equal to the time constant of the bimetal element plus the iteration period of the equation. The second calculation was to create an ER variable which equals the $ANT_{new1}$ subtracted from the quantity of a setpoint entered into the thermostat by an operator minus a room temperature by the thermostat.

Block 250 shows that if the ER variable was greater than zero, the HVAC equipment was turned on. Otherwise, the thermostat returns to block 240 via blocks 252 and 254. Blocks 252 and 254 set $ANT_{old1}$ equal to $ANT_{new1}$, and then reset $ANT_{new1}$ at zero. The steps of blocks 240 through 250 would be performed once per second, or more infrequently.

Blocks 270 through 290 show what happened once the HVAC equipment was turned on. In block 270, the last $ANT_{new1}$ created before entering block 260 was used to create an $ANT_{new2}$ variable as shown. $ANT_{new2}$ was now used to calculate error variable ER. If ER was less than -1, then the HVAC equipment was shut off. Otherwise, the calculations in block 270 reoccur after passing through blocks 282 and 284. These blocks operate similarly to blocks 252 and 254, with $ANT_{old2}$ and $ANT_{new2}$. This would happen once per second, or more or less frequently.

One problem associated with the prior art methods was that some calculations required division. A microprocessor 20 requires software code in order to perform such an operation. This used memory in the microprocessor and elsewhere which might have been better used in other ways.

Also, when it is desired to run the conditioning equipment at different cycle rates, the factor K had to be adjusted or the iteration period had to be adjusted.

Further, while the prior art method was a numerical way of modeling a mechanical anticipator and with enough resolution would be an exact model, this was not necessary or desirable when only a limited resolution was being used.

SUMMARY OF THE INVENTION

The present invention is a method of thermostat control which eliminates the need for division to perform HVAC system turn on and off, while still operating in a way which models a mechanical thermostat having an anticipator. In addition, the new method only requires a constant to be changed in order for the system to run at different cycle rates.

A thermostat having a microprocessor determines the difference between the thermostat's setpoint and the room temperature and accumulates these differences plus a predetermined constant, until the accumulated amount exceeds a predetermined number. Connected HVAC equipment is then activated. The predetermined number may be a function of thermostat droop, a desired HVAC system cycle per hour rate and the particular mechanical anticipator being modeled. The predetermined constant may be a function of the operation of the mechanical anticipator.

After activation of the HVAC equipment, the thermostat then accumulates the difference between the setpoint and room temperature along with the thermostat droop and the previously described constant. When the second accumulated amount again exceeds the predetermined number, the HVAC equipment is then shut off.

This process turns HVAC equipment on and off without using a divide function. It therefore can run on a microprocessor which does not need such a capability which accordingly creates more room in microprocessor memory for use by other processes.

BRIEF DESCRIPTION OF THE DRAWING

FIG. 1 is a simplified block diagram of an electronic thermostat.

FIG. 2 is a flow chart showing one prior art method of controlling on and off times in a thermostat.

FIG. 5 is a chart comparing actual on and off times of one mechanical anticipator with the on and off times of one embodiment of the present invention.

DETAILED DESCRIPTION OF THE PREFERRED EMBODIMENT

Figure 3:
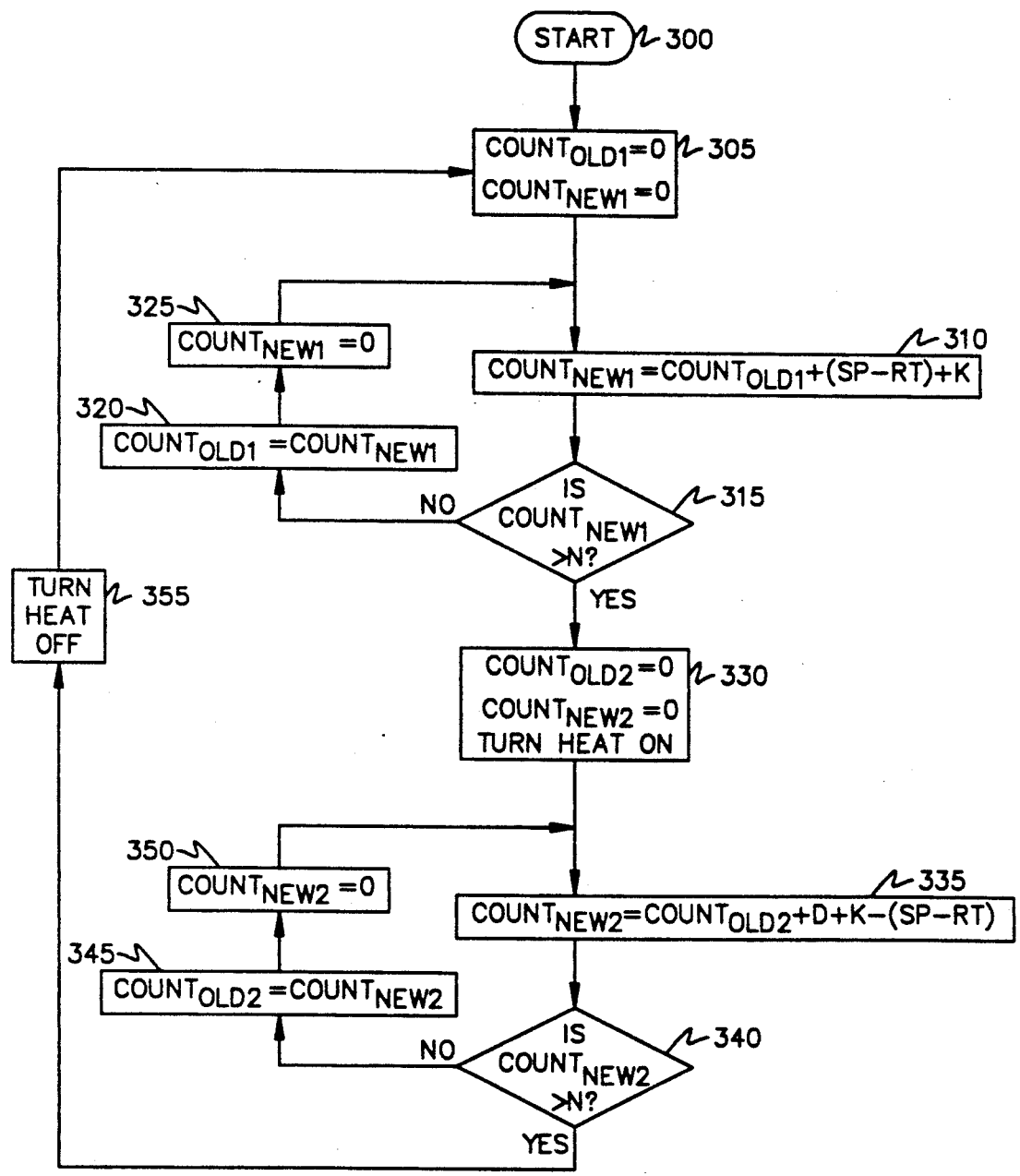
FIG. 3 is a flow chart showing the presently inventive method of controlling on and off times of a heater using a thermostat.

FIG. 1 shows a simplified block diagram of an electronic thermostat 5. Thermostat 5 includes temperature sensing element 10, temperature setting control 15 and a microprocessor 20.

The temperature sensing element 10 is connected to the microprocessor 20 and produces a temperature indicative of room temperature surrounding the thermostat. Temperature setting control 15 is connected to microprocessor 20 and is used to enter a setpoint into microprocessor 20.

Microprocessor 20 includes a memory (not shown) which stores one or more processes which control the operation of the thermostat. One of the processes controls when the thermostat turns the HVAC equipment on and off. The inventive process for turning the thermostat on and off is described with reference to FIG. 3.

After starting at block 300, the process initializes $Count_{new1}$ and $Count_{old1}$ variables to equal zero. The $Count_{new1}$ variable is then modified in block 310 to equal $Count_{old1}$ plus a constant K plus the difference between the thermostat setpoint SP and the room temperature RT. The constant K will be further described below.

At block 315, $Count_{new1}$ is compared to a preselected number N. If $Count_{new1}$ is greater than N, the HVAC equipment is turned on as shown in block 330. Otherwise, $Count_{old1}$ is set equal to $Count_{new1}$ and $Count_{new1}$ is reset to zero as shown in blocks 320 and 325. Then, after a delay of a predetermined length occurs, the process begins again at block 310.

If the heat is turned on in block 330, new variables $Count_{new2}$ and $Count_{old2}$ are initialized as equal to zero. Then, $Count_{new2}$ is modified by summing $Count_{old2}$, thermostat droop D, the constant K and subtracting from the sum, the difference SP-RT.

Then, $Count_{new2}$ is compared to N again. If $Count_{new2}$ is greater than N, the heat is shut off at block 355 and the entire process begins again at block 305. If $Count_{new2}$ is less than N, $Count_{old2}$ is set equal to $Count_{new2}$ and $Count_{new2}$ is reset to zero as shown in blocks 345 and 350. The shutoff process then reverts to block 335 after a predetermined delay period.

Figure 4:
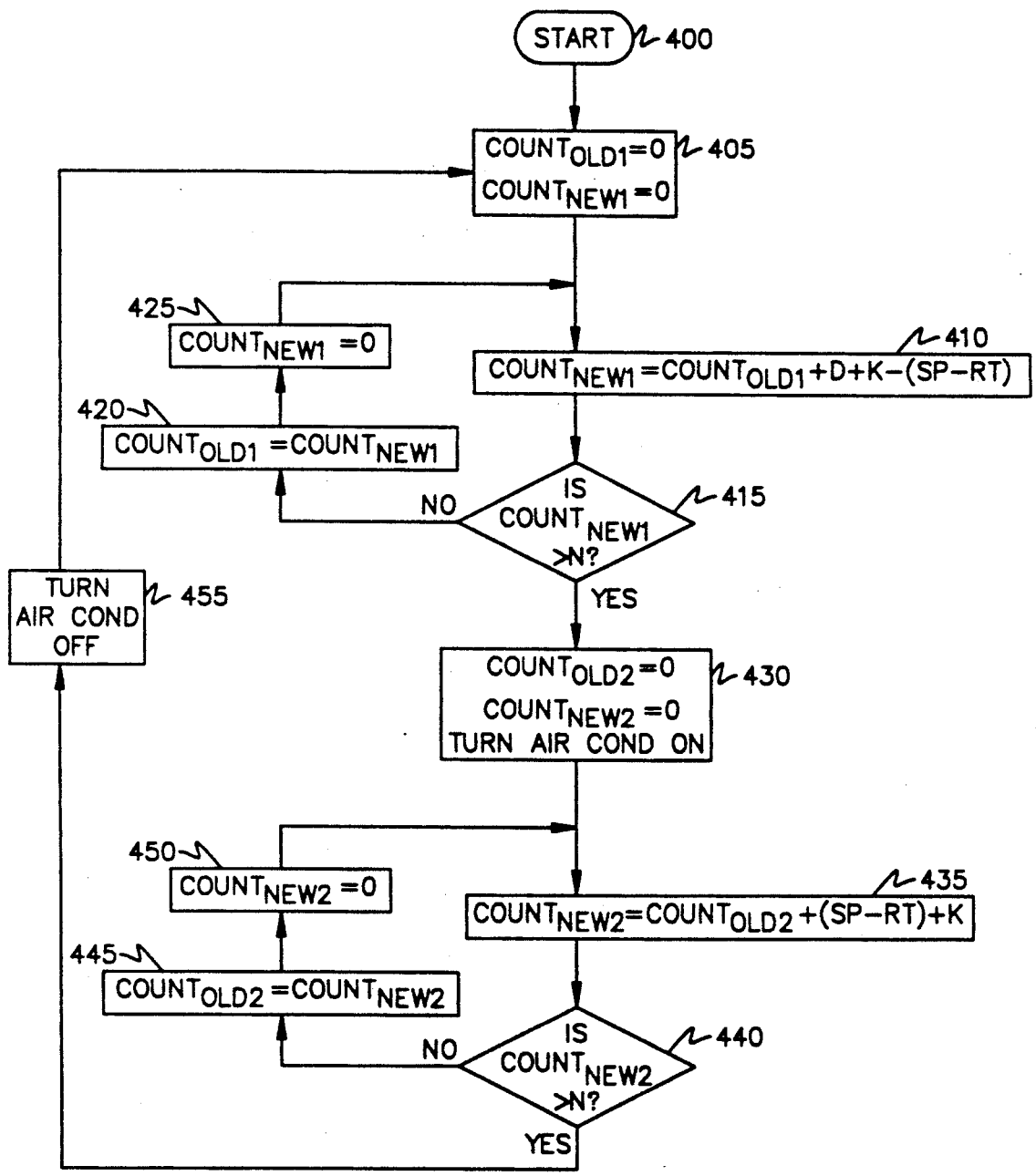
FIG. 4 is a flow chart showing the presently inventive method of controlling on and off times of an air conditioner using a thermostat.

FIG. 4 shows the process used for cooling instead of heating. Note that this process is essentially the same as the heating process with the exception that the equations in blocks 410 and 435 are reversed with respect to the equations in blocks 310 and 335.

In both FIGS. 3 and 4, variables are compared to a number N to determine whether there should be a change in state of the HVAC system. The calculation of N depends upon a number of factors:

$$N = [(TH - SD) - DROOP]\frac{[Ton]}{[IP]}$$

where
TH = total heat which can be put into the anticipator;
SD = switch differential between switch on point and switch off point;
DROOP = setpoint minus room temperature at the desired load;
IP = iteration period between performance of calculations to determine $Count_{new1}$; and
Ton = on time of bimetal being modeled at selected DROOP.

The presently inventive system models the anticipator found in a Honeywell T87 SM thermost. T87 is a trademark of Honeywell Inc. Inserting the T87 numbers into the above equation at a desirable load of 50 percent, the T87 has: a TH=4 degrees; a SD=1 degree, DROOP=1.5 degrees. For an iteration period of 1 second and a desirable cycle per hour rate of 6CPH, N equals 543. Thus, for example, in FIG. 3, when $Count_{new1}$ exceeds 543, the heat would be turned on and when $Count_{new2}$ exceeds 543, the heat would be turned off. N can be varied as iteration periods vary.

Referring now to FIG. 5, thereshown is a chart comparing the on and off times of an HVAC system generated by first, the T87 thermostat, second, an electronic thermostat using the inventive process without a constant and lastly an electronic thermostat using the inventive process with a constant.

The T87 has on and off times can be determined using the following equations:

$$t_{on} = \text{Time Constant} \times \ln\frac{(Droop - 3)}{(Droop - 4)}$$

$$t_{off} = \text{Time Constant} \times \ln\frac{(Droop)}{(Droop + 1)}$$

Insertion of the Droop listed produces the shown on and off times. The Time Constant can be determined mathmatically from desired cycle rate from which a particular temperature sensitive element (bimetal) may be chosen.

The middle column shows the on and off times for an electronic thermostat using the equations in blocks 310 and 335 (or alternately 410 and 435) but without the constant K. Note that the off times at the low Droop and the on times at high Droop are not close to those of the T87 thermostat.

To correct this problem, a constant K has been added to the equation. The effects of using a K=0.31 are shown in the last column where the on and off times are closer to the T87 times being modeled. As was noted, the on and off times varied from the mechanical anticipator without the K as the DROOP was very low or very high. This in turn caused N to vary. It is desirable to have the same N for all DROOPS. If we solve the equation that gives the value N at two load points, K can be determined such that the inventive simplified counting scheme matches the on and off times of the T87 for all conditions. Thus, we have the equation:

$$((TH-SD)-DROOP1+K) \times T_{on1} = ((TH-SD)-DROOP2+K) \times T_{on2}$$

which is solved for K. Then, the corrected N is found through the equation:

$$N = ((TH - SD) - DROOP + K)\frac{Ton}{IP}$$

Use of this equation yields a slightly different K than the K shown in the third column. However, minor modifications to K may need to be made due to the limited math capabilities of the chosen processor, for example a four bit processor.

The foregoing has been a description of a novel and non-obvious process for thermostatic control. The inventor does not intend that this description be limiting, but instead defines his invention by use of the claims appended hereto.

I claim:

1. A method of controlling the operation of HVAC equipment in a thermostat, the thermostat having a set point and droop and measuring a room temperature, comprising the steps of:
   (a) creating Count variable having a preselected initial value;
   (b) creating a first new Count variable which is equal to said Count variable plus a first difference between the setpoint and the room temperature;
   (c) comparing the new Count variable to a preselected number;

(d) producing a first signal for changing states of the HVAC equipment from a first state to a second state, resetting the Count variable to said initial variable and moving to a step (e) if the new Count variable exceeds the preselected number, and returning to step (b) otherwise;

(e) creating a second new Count variable which is equal to said Count variable plus the droop minus a second difference between said setpoint and said room temperature;

(f) comparing said second new Count variable to said preselected number; and (g) producing a second signal to change states of the HVAC equipment from said second state to said first state, resetting said Count variable to said initial value and returning to step (b) if said second new Count variable exceeds the preselected number, and returning to step (e) otherwise.

2. The method of claim 1, wherein:

said calculations of said first and second new Count variables in steps (b) and (e) include addition of a constant to said sums, said constant being chosen to cause the process to better model a preselected mechanical anticipator.

* * * * *